(12) United States Patent
Madden et al.

(10) Patent No.: US 11,037,147 B2
(45) Date of Patent: Jun. 15, 2021

(54) MONEY TRANSFER FRAUD PREVENTION METHODS AND SYSTEMS

(75) Inventors: William Madden, Denver, CO (US); Chris Cochran, Highlands Ranch, CO (US); Patty McKernan, Parker, CO (US)

(73) Assignee: The Western Union Company, Denver, CO (US)

( * ) Notice: Subject to any disclaimer, the term of this patent is extended or adjusted under 35 U.S.C. 154(b) by 2209 days.

(21) Appl. No.: 13/544,564

(22) Filed: Jul. 9, 2012

(65) Prior Publication Data

US 2014/0012763 A1    Jan. 9, 2014

(51) Int. Cl.
*G06Q 20/40*    (2012.01)

(52) U.S. Cl.
CPC ......... *G06Q 20/401* (2013.01); *G06Q 20/409* (2013.01); *G06Q 20/4018* (2013.01)

(58) Field of Classification Search
CPC ..................................................... H04W 12/06
USPC ......................................................... 705/71
See application file for complete search history.

(56) References Cited

U.S. PATENT DOCUMENTS

| | | | | |
|---|---|---|---|---|
| 4,700,055 A * | 10/1987 | Kashkashian, Jr. | | G06Q 20/341 235/379 |
| 5,559,961 A * | 9/1996 | Blonder | ................... | G06F 21/36 726/18 |
| 5,787,186 A * | 7/1998 | Schroeder | .......... | G06K 9/00221 382/115 |
| 6,203,427 B1 * | 3/2001 | Walker et al. | ................... | 463/16 |
| 7,849,321 B2 * | 12/2010 | Mizrah | ......................... | 713/182 |
| 8,036,433 B1 * | 10/2011 | Wolff | ............................. | 382/119 |
| 8,176,336 B1 * | 5/2012 | Mao et al. | ..................... | 713/189 |
| 8,321,930 B1 * | 11/2012 | Taylor | ................... | H04L 9/3271 726/17 |
| 8,555,191 B1 * | 10/2013 | Swayne | ................ | G06F 3/0233 715/773 |
| 8,666,841 B1 * | 3/2014 | Claridge | ................ | G06Q 30/00 705/26.35 |
| 10,297,105 B2 * | 5/2019 | LeMay | ............... | G07F 17/3244 |
| 2002/0178124 A1 * | 11/2002 | Lewis | .............. | G06Q 20/40145 705/67 |
| 2003/0130032 A1 * | 7/2003 | Martinek et al. | ............... | 463/29 |
| 2005/0166041 A1 * | 7/2005 | Brown | ......................... | 713/150 |
| 2005/0240777 A1 * | 10/2005 | Keohane et al. | ............. | 713/185 |
| 2006/0156385 A1 * | 7/2006 | Chiviendacz | ......... | H04L 9/3271 726/2 |
| 2006/0283957 A1 * | 12/2006 | Blumenfeld | ........... | B42D 25/20 235/487 |

(Continued)

OTHER PUBLICATIONS

Haichang Gao et al (YAGP: Yet Another Graphical Password Strategy) (Year: 2008).*

*Primary Examiner* — Mamon Obeid
(74) *Attorney, Agent, or Firm* — Kilpatrick Townsend & Stockton LLP

(57) ABSTRACT

Embodiments of the invention provide a fraud deterrent for retail money transfer or stored value product. In some embodiments, a two dimensional grid of number, letters, characters, and/or symbols can be provided retail packaging or cards that can be used as a second authentication factor in order to redeem funds. In some embodiments, methods and/or systems are also provided that associate control numbers with the grid, create the grid, provide the grid on packaging, and/or use the grid to authenticate a customer.

12 Claims, 11 Drawing Sheets

(56) References Cited

U.S. PATENT DOCUMENTS

| | | | |
|---|---|---|---|
| 2007/0005967 A1* | 1/2007 | Mister et al. | 713/168 |
| 2007/0083615 A1* | 4/2007 | Hollebeek et al. | 709/218 |
| 2008/0235788 A1* | 9/2008 | El Saddik et al. | 726/18 |
| 2008/0244700 A1* | 10/2008 | Osborn | G06F 21/36 726/2 |
| 2009/0138712 A1* | 5/2009 | Driscoll | 713/170 |
| 2009/0164293 A1* | 6/2009 | Coley | 705/9 |
| 2009/0271624 A1* | 10/2009 | Cao et al. | 713/169 |
| 2009/0284344 A1* | 11/2009 | Craymer et al. | 340/5.54 |
| 2010/0043062 A1* | 2/2010 | Alexander et al. | 726/6 |
| 2010/0306533 A1* | 12/2010 | Phatak | 713/156 |
| 2010/0322485 A1* | 12/2010 | Riddiford | G06F 21/36 382/115 |
| 2011/0119746 A1* | 5/2011 | Yang | H04L 9/3271 726/7 |
| 2011/0213983 A1* | 9/2011 | Staugaitis et al. | 713/176 |
| 2011/0213985 A1* | 9/2011 | Miller | G06F 21/43 713/185 |
| 2012/0005483 A1* | 1/2012 | Patvarczki et al. | 713/182 |
| 2012/0066744 A1* | 3/2012 | Knox | 726/4 |
| 2012/0102551 A1* | 4/2012 | Bidare | 726/4 |
| 2012/0173873 A1* | 7/2012 | Bell et al. | 713/156 |
| 2013/0332739 A1* | 12/2013 | Yi et al. | 713/171 |
| 2014/0012763 A1* | 1/2014 | Madden | G06Q 20/409 705/71 |
| 2014/0295932 A1* | 10/2014 | Irwin, Jr. | G07F 17/326 463/17 |
| 2015/0363683 A1* | 12/2015 | Polzoni | G06K 19/06037 235/494 |
| 2019/0312861 A1* | 10/2019 | Kairi | H04L 9/3228 |

\* cited by examiner

|   | A | B | C | D | E | F | G | H |
|---|---|---|---|---|---|---|---|---|
| 1 | x | 8 | k | 3 | e | s | r | 4 |
| 2 | n | f | 5 | u | y | f | a | z |
| 3 | 5 | d | 3 | s | d | d | g | 3 |
| 4 | d | g | d | r | h | a | s | 3 |
| 5 | g | d | h | 4 | a | w | s | d |
| 6 | g | e | 3 | 3 | 2 | x | f | a |
| 7 | 6 | x | s | d | f | 6 | 6 | a |
| 8 | 4 | 8 | a | 9 | 4 | 4 | 3 | q |

|   | A | B | C | D | E | F | G | H |
|---|---|---|---|---|---|---|---|---|
| 1 | 1 | 2 | 3 | 4 | 5 | 6 | 7 | 8 |
| 2 | 9 | 10 | 11 | 12 | 13 | 14 | 15 | 16 |
| 3 | 17 | 18 | 19 | 20 | 21 | 22 | 23 | 24 |
| 4 | 25 | 26 | 27 | 28 | 29 | 30 | 31 | 32 |
| 5 | 33 | 34 | 35 | 36 | 37 | 38 | 39 | 40 |
| 6 | 41 | 42 | 43 | 44 | 45 | 46 | 47 | 48 |
| 7 | 49 | 50 | 51 | 52 | 53 | 54 | 55 | 56 |
| 8 | 57 | 58 | 59 | 60 | 61 | 62 | 63 | 64 |

505 x8k3esr4nf5uyfaz5d3sddg3dgdrhas3gdh4awsdge332xfa6xsdf66a48a9443q

510

|   | A | B | C | D | E | F | G | H |
|---|---|---|---|---|---|---|---|---|
| 1 | x | 8 | k | 3 | e | s | r | 4 |
| 2 | n | f | 5 | u | y | f | a | z |
| 3 | 5 | d | 3 | s | d | d | g | 3 |
| 4 | d | g | d | r | h | a | s | 3 |
| 5 | g | d | h | 4 | a | w | s | d |
| 6 | g | e | 3 | 3 | 2 | x | f | a |
| 7 | 6 | x | s | d | f | 6 | 6 | a |
| 8 | 4 | 8 | a | 9 | 4 | 4 | 3 | q |

*Figure 5*

MONEY TRANSFER FRAUD PREVENTION METHODS AND SYSTEMS

BACKGROUND

Using a money-transfer system, money can be transferred between two people in two different locations. A money transfer company can have a number of agents that establish a site for money to be sent or received. These agents can be hired by third parties and may not be trained or supervised by the money transfer company. Some of these agents may seek to defraud the money transfer company or its customers. And these agents may also be easy targets for fraudsters.

BRIEF SUMMARY

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

Embodiments of the invention provide a fraud deterrent for retail money transfers or stored value products. In some embodiments, a two dimensional grid of numbers, letters, characters, and/or symbols can be provided on retail packaging or cards that can be used as an authentication factor (often a secondary factor) in order to redeem funds. In some embodiments, methods and/or systems are also provided that associate control numbers with the grid, create the grid, provide the grid on packaging, and/or use the grid to authenticate a customer. Various other embodiments of the invention are disclosed.

Embodiments of the invention also include a financial product package that includes a financial product, packaging material coupled with the financial product, a control number printed on the financial product package, and an authentication grid printed on the financial product package. The authentication grid can include a plurality of symbols identifiable by row and column identifiers. In some embodiments, the authentication grid can be associated with the control number. In some embodiments, the control number can be secured or hidden.

In some embodiments, the financial product can be a stored value card, a prepaid credit card, a debit card, a money card, a money transfer card, etc. In some embodiments, the financial product is a plastic card. In some embodiments, the control number can be a money transfer control number (MTCN), an account number, a card number, a transfer code. etc.

In some embodiments, the plurality of symbols in the authentication grid are generated from the control number using a cryptographic function, and/or can include characters, symbols, and numbers. In some embodiments, the control number is printed on the packaging material or the financial product. In some embodiments, the authentication grid can be printed on the packaging material or the financial product.

A method is also disclosed that includes receiving a control number; generating a hash value from the control number using a cryptographic function; generating an authentication grid using characters from the hash value; and printing the authentication grid and/or the control number on a financial product package that comprises either or both a financial product and packaging material. In some embodiments, the authentication grid can be a plurality of the characters identifiable by row and column identifiers. In some embodiments, the hash value can be a string of characters.

In some embodiments, the method can also include mapping the characters from the hash value to unique symbols; and generating an authentication grid using the unique symbols mapped from the hash value, wherein the authentication grid includes a plurality of the unique symbols identifiable by row and column identifiers. In some embodiments, the control number can be received from a financial organization through a computer network and/or the control number is received from a computer module or algorithm.

Another method is also disclosed that includes receiving a control number from a consumer; producing a representation of an authentication grid using the control number; identifying a specific row identifier and a specific column identifier; sending to the consumer a request to provide the symbol associated with the specific row identifier and the specific column identifier; receiving a response from the consumer that includes a response symbol; comparing the response symbol with the symbol in the authentication grid associated with the specific row identifier and the specific column identifier; and in the event the response symbol and the symbol in the authentication grid associated with the specific row identifier and the specific column identifier match, authenticate the consumer. In some embodiments, the authentication grid can include a plurality of symbols identifiable by row and column identifiers.

In some embodiments, producing the representation of the authentication grid using the control number can include generating a hash value that includes a string of characters from the control number using a cryptographic function, and generating an authentication grid using the individual characters from the hash value, where the authentication grid includes a plurality of individual characters from the string identifiable by row and column identifiers.

In some embodiments, the control number can be received through a web server and the request to provide the symbol associated with the specific row identifier and the specific column identifier can be sent through the web server. In other embodiments, the control number can be received through an agent computer system and the request to provide the symbol associated with the specific row identifier and the specific column identifier is sent to the agent computer system.

BRIEF DESCRIPTION OF THE DRAWINGS

Illustrative embodiments of the present invention are described in detail below with reference to the following drawing figures.

FIG. 2 is an example of an authentication grid that can be used to provide authentication according to some embodiments of the invention.

FIG. 5 shows examples of authentication grids that can be used to provide authentication according to some embodiments of the invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention provide an authentication grid that can be used to authenticate a consumer. In some embodiments, the authentication grid can be printed on a financial product and/or on the packaging of a financial product. In some embodiments, the authentication grid can be created using a hash value of a cryptographic function of a control number associated with the financial product. That is, the control number, for example, can be used as input to the cryptographic function. In some embodiments the authentication grid can be used to authenticate or validate that a consumer is in possession of either the financial product and/or the packaging from the financial product.

As used herein, the term "financial product" is a physical item that can be purchased by a consumer and used as legal tender. A financial product, for example, can be a stored value card, a prepaid credit card, a money transfer, a money card, a money transfer card (e.g., goCASH), etc.

As used herein, the term "control number" is an identifier that that associates a financial product at a financial institution with a funds. A control number, for example, can include a money transfer control number (MTCN), an account number, a card number, a transfer code, etc.

Figure 1:
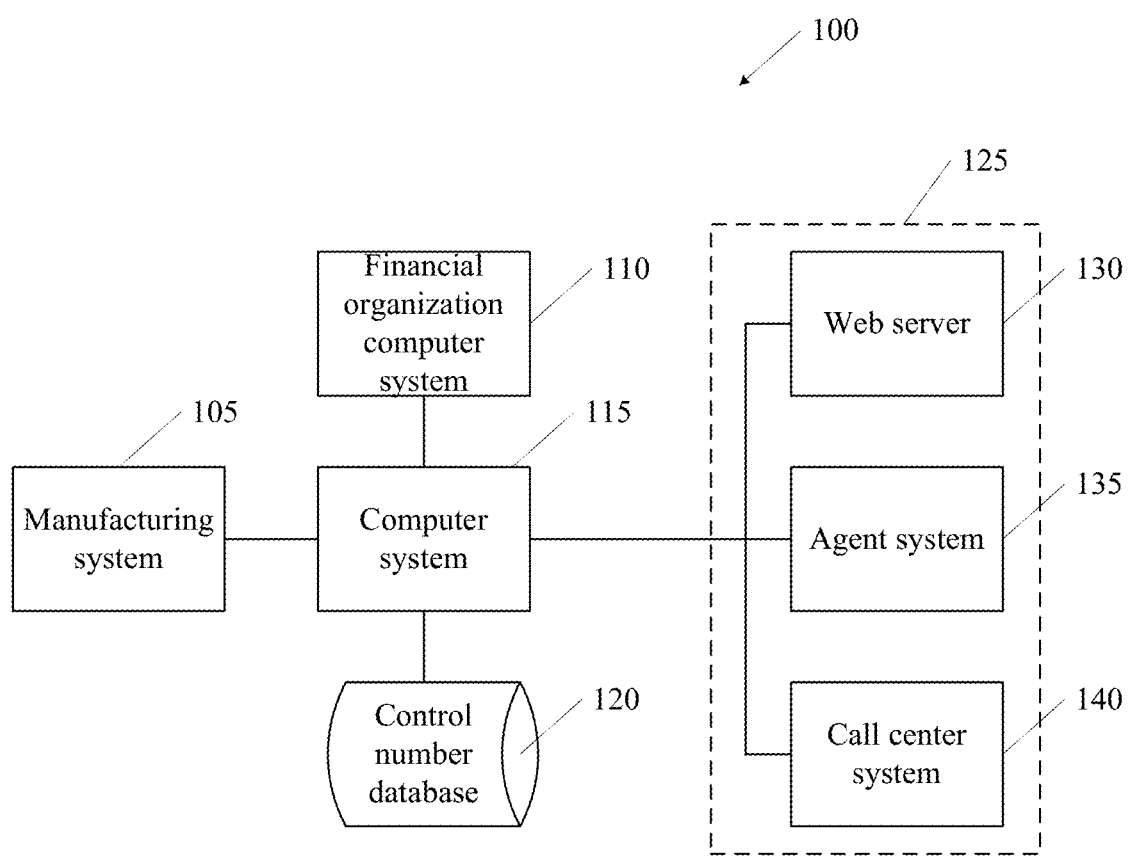
FIG. 1 is a block diagram of a system that can be used to provide an authentication grid according to some embodiments of the invention.

FIG. 1 is a block diagram of system 100 that can be used to provide an authentication grid according to some embodiments of the invention. System 100 includes computer system 115 that is coupled with financial organization computer system 110, manufacturing system 105, control number database 120, and/or customer interface system. Computer system 115 can provide operational control or coordination amongst the various components. The various blocks shown in FIG. 1 that make up system 100 can be coupled directly to one another as shown in the figure and/or communicatively coupled through a network (e.g., the Internet). In some embodiments all systems and/or devices shown in FIG. 1 can be coupled together through network and can communicate with one another.

Manufacturing system 105 can include a device(s) that manufactures and/or packages a financial product. Manufacturing system 105 can include a printer that can print packaging graphics include an authentication grid on the packaging of financial products or on the financial product.

Financial organization computer system 110 can be a computer system associated with any financial institution such as, for example, a bank, a credit union, a money transfer organization, a credit card company, stored value card provider, a retail store, an online store, etc. The financial organization computer system 110 can provide control numbers provided by the financial organization that are associated with the financial product manufacture or packaged by the manufacturing system.

Control number database 120 is coupled with computer system 115 and is used to store control numbers, hashes, hash functions, authentication grids, etc. Any type of computer storage device can be used such as, for example, a server, hard drive, cloud drive, etc.

Consumer interface system 125 can be coupled with computer system 115. The interface can be used to authenticate consumers. Consumer interface system 125 can act as an intermediary between the consumer and computer system 115. Consumer interface system 125 can include web server 130, agent system 135, and/or call center system 140. Web server 130 can include a web server(s). Agent system 135 can include a computer system accessible by an agent of the financial organization. And call center system 140 can include a computer system accessible by a call center agent.

Computer system 115 can coordinate the manufacture and/or packaging of a financial product as described below in more detail. This can include, for example, receiving control numbers from financial organization computer system 110. Computer system 115 can create an authentication grid for each control number received from financial organization computer system 110. Computer system 115 can send the control numbers and/or the authentication grids to manufacturing system 105 so that the control numbers and the authentication grids can be included with the financial product (e.g., as part of the packaging). Computer system 115 can store the control number, a hash of the control number, a hash key, and/or the authentication grid within control number database 120. Computer system 115 can also coordinate the authentication of a consumer through consumer interface system 125. In some embodiments, only the control number is stored in control number database. In other embodiments, the control number is only stored at the financial organization.

Figure 9:
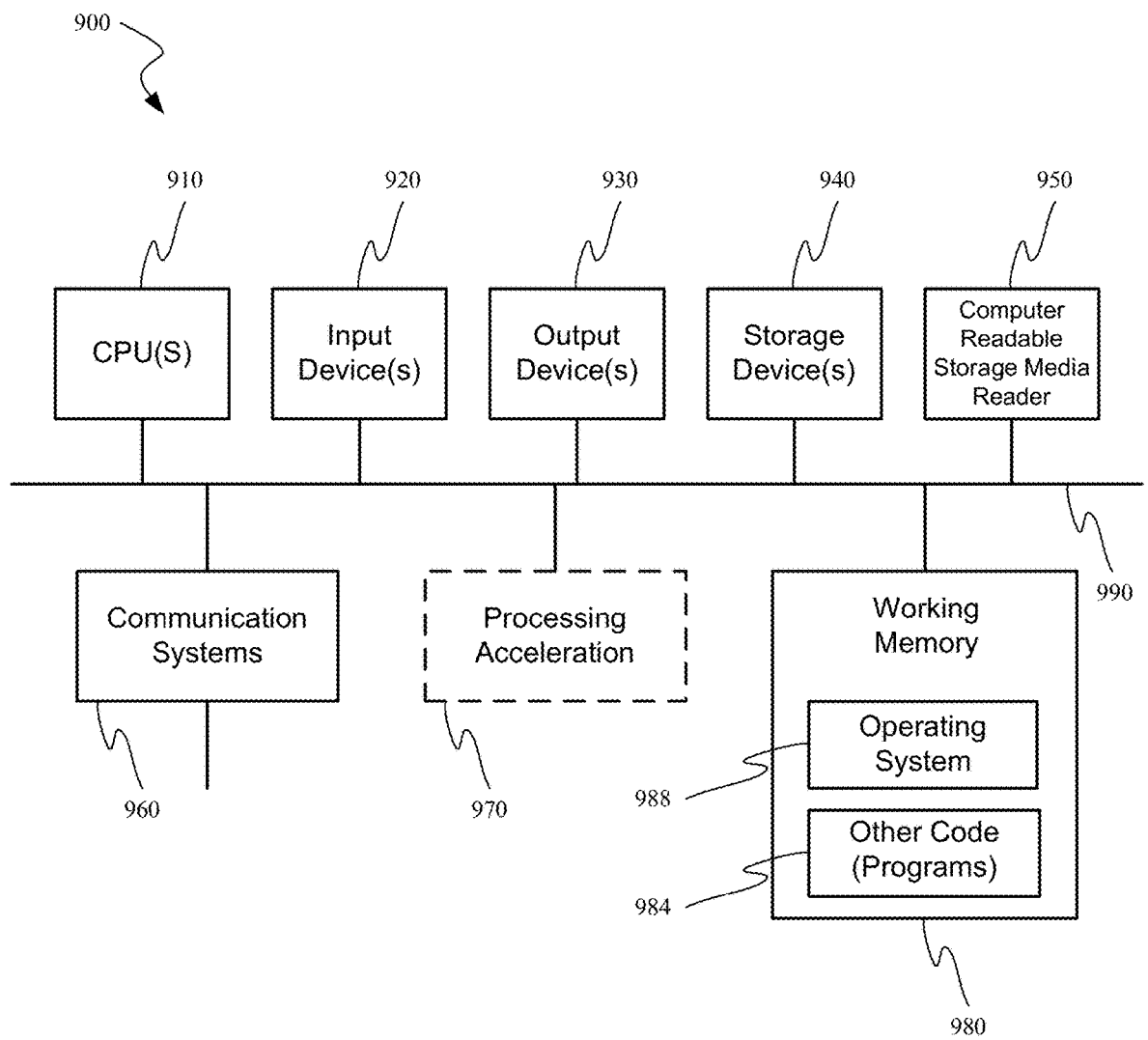
FIG. 9 is a block diagram of a computer system capable of being used in at least some portion of the apparatuses or systems of the present invention, or implementing at least some portion of the methods of the present invention.

Each block in system 100 can include one or more of the computer systems show in FIG. 9. Moreover system 100 can be used to implement all or portions of the methods shown in FIGS. 3, 4, 6, and 7. Moreover, blocks can be omitted and/or combined. And additional blocks and/or systems can be added.

FIG. 2 shows authentication grid 200 that is an example of a gird can be used to provide authentication according to some embodiments of the invention. Authentication grid 200 includes eight rows and eight columns of characters. Each column includes a header row (top row) identifying the column by letter A-H. And each row includes a header column (leftmost column) identifying each row by number 1-8. The 64 characters used to populate authentication grid 200 can be created applying a 64 bit cryptographic hash function (e.g., SHA-2) to a control number. The authentication grid can be printed on a financial product or the packaging of the financial product. To authenticate a consumer, the consumer can be asked to provide one or more characters from within the authentication grid. For example, the consumer interface system can ask the consumer to identifying a character associated with a row (1-8) and a column (A-H). A correct response(s) shows that the consumer is in possession of the financial product and/or packaging, and provides an increased level of fraud protection.

Figure 3:
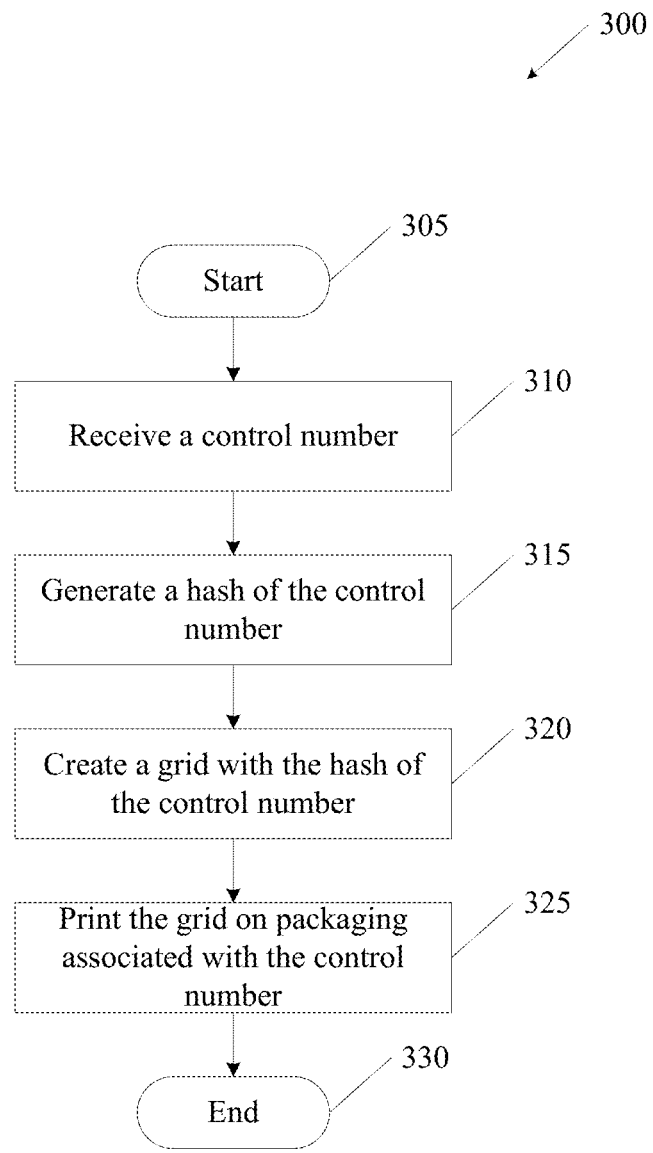
FIG. 3 is a flowchart of a method for creating an authentication grid according to some embodiments of the invention.

FIG. 3 is a flowchart of method 300 for creating an authentication grid according to some embodiments of the invention. Method 300 begins at block 305. At block 310 one or more control numbers are received. These control numbers can be received, for example, at computer system 115 from financial organization computer system 110. In some embodiments, computer system 115 can create the control numbers. For example, an algorithm, module, routine, method, and/or process can be executed by computer system 115 in conjunction with method 300 to produce the control numbers.

At block 315 a hash can be generated from each control number. For example, the control number can be used as the input for a cryptographic function that outputs a hash value that is a fixed size character string. Any type of cryptographic function can be used; for example, the secure hash algorithm (SHA-0, SHA-1, SHA-2, SHA-3). Various other algorithms are known in the cryptography fields that can also be used without limitation.

At block 320 an authentication grid can be created (e.g., authentication grid 200) using the hash value. In some embodiments, the cryptographic function used in block 315 can be chosen to produce a hash value with the correct number of characters to populate the entire authentication grid. In other embodiments, the hash value can be repeated throughout the grid if the character string has fewer characters than grid locations or concatenated if the hash value is too long. Regardless, an authentication grid is created from the hash of the control number. Authentication grid 200, for example, can be created using the SHA-2 cryptographic function that returns 64 characters.

As shown in grid 500 in FIG. 5 each grid element is numbered in order from left to right and top to bottom. Character string 505 can be generated, for example, as a hash value using a cryptographic function. Each character from character string 505 can then be systematically placed in order within grid 500 to produce authentication grid 510. That is, the first character of character string 505 can be placed in grid element 1 shown in grid 500, the second character of character string 505 can be placed in grid element 2 shown in grid 500, the third character of character string 505 can be placed in grid element 3 shown in grid 500, and so on to produce authentication grid 510.

Returning to FIG. 3, at block 325 the authentication grid can be printed on the financial product or on the package of the financial product with or without the control number. Method 300 can then end at block 330.

The blocks shown in method 300 can be rearranged, blocks can be added, and/or blocks can be deleted without limitation.

Figure 4:
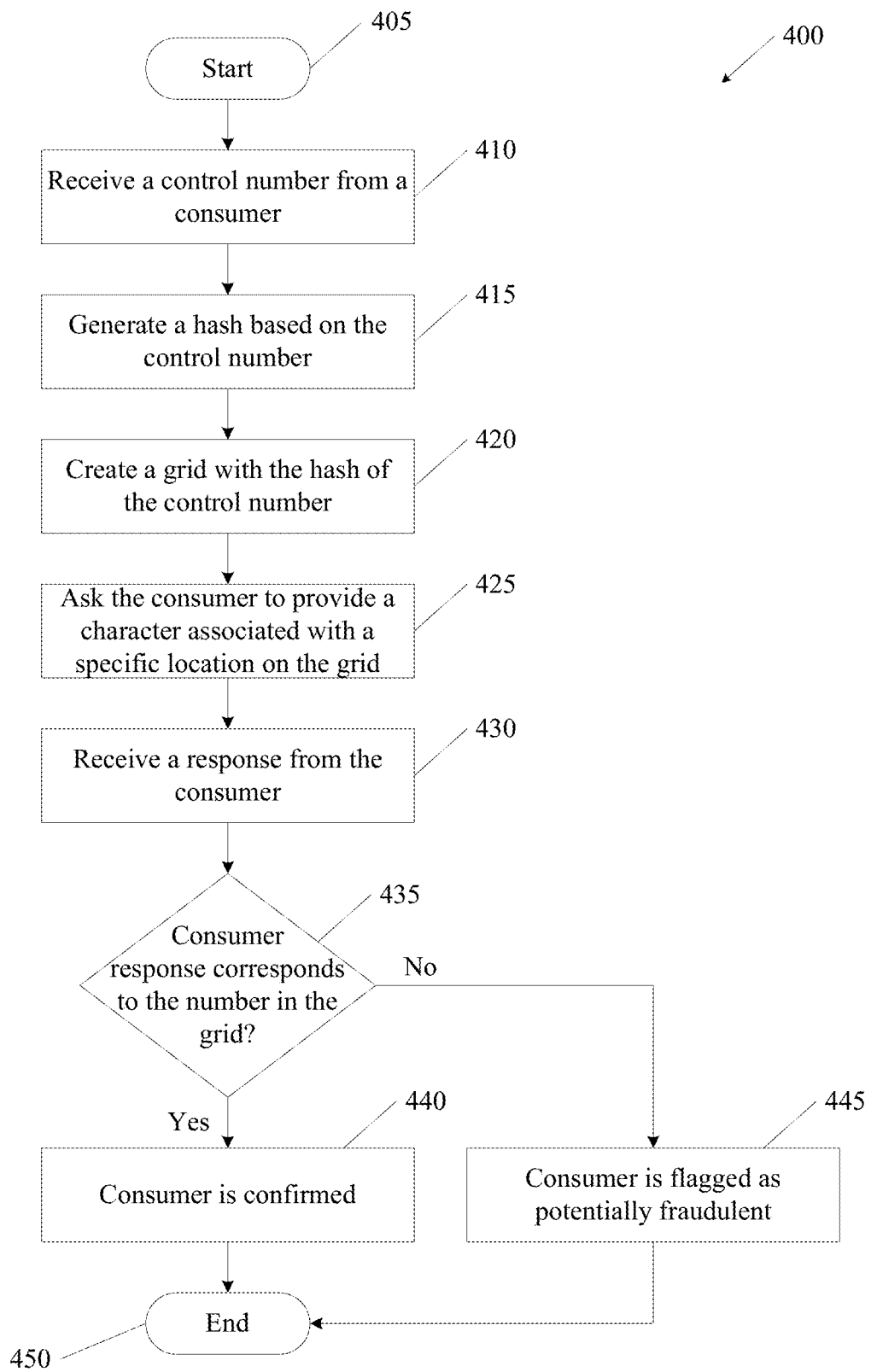
FIG. 4 is a flowchart of a method for using an authentication grid according to some embodiments of the invention.

FIG. 4 is a flowchart of method 400 for using an authentication grid according to some embodiments of the invention. Method 400 starts at block 405. At block 410 a control number can be received from a consumer. For example, the control number can be received from a consumer through consumer interface system 125. The control number, for example, can be requested for authentication for a money transfer or other financial transaction. The control number, for example, can be requested and/or received through a web interface using web server 130, an agent using agent system 135, a call center agent using call center system 140, or another consumer interface.

At block 415 the control number can be used to create a hash value using the same cryptographic function (and/or including the same keys) as were used to create the authentication grid. This can be done with computer system 115 using, for example, the cryptographic function and/or keys stored in control number database 120. At block 420 the hash can be used to recreate the authentication grid.

Using the authentication grid, the consumer can be asked to provide a character associated with a specific location on the grid at block 425. Using authentication grid 200 as an example, the consumer can be asked to provide the character found in grid location F6. That is, the character at the intersection of column F and row 6. In this example, the character is "x". The consumer can be asked to provide this character by referencing the grid location, for example, through a web page hosted by web server 130, an agent using agent system 135, a call center agent using call center system 140, or another consumer interface. Various other notations specifying grid locations can be used.

Ideally, the consumer is in possession of the authentication grid printed on the packaging or financial product and can provide the correct response. In the example mentioned above, the consumer can look up the printed character in column F and row 6 of printed authentication grid 200, which should be the letter "x". At block 430 a response from the consumer can be received by the system. At block 435, the received response can be compared with the number in the grid. Thus, in the current example using authentication grid 200, if the consumer responds with the character "x" method 400 proceeds to block 440, if anything else is returned then method 400 proceeds to block 445.

In some embodiments, blocks 425, 430, and 435 can be repeated any number of times with different grid locations being provided to the consumer to provide further authentication assurance.

In some embodiments, the authentication grid may not be completely recreated in block 420. Instead, for example, the hash value along with knowledge of the authentication grid layout can be used to query the consumer. For example, at block 425 of method 400, a random column and row can be requested. The character number in the hash string can be identified based on the size of the grid. For example, grid 500 shows the character number within a string for each grid location. The consumer's response can be compared with the character from the hash string without creating a grid. As shown in grid 500, grid location F4 corresponds to the $30^{th}$ character in the hash string. And as shown by character string 505 in FIG. 5, which, in this example, is a hash value, the $30^{th}$ character is the letter "a", which is the letter shown at grid location F4 in authentication grid 510.

Method 400 can end at block 450. The blocks shown in method 400 can be rearranged, blocks can be added, and/or blocks can be deleted without limitation.

Figure 6:
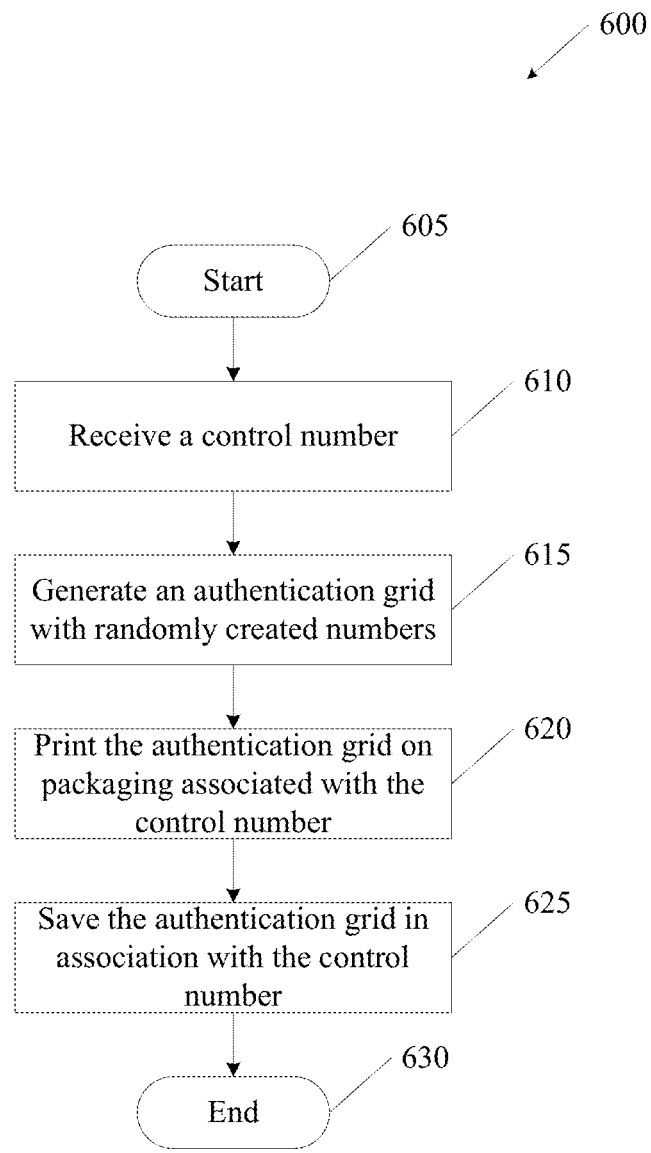
FIG. 6 is a flowchart of a method for creating an authentication grid according to some embodiments of the invention.

FIG. 6 is a flowchart of method 600 for creating an authentication grid according to some embodiments of the invention. Method 600 begins at block 605. At block 610 one or more control numbers are received. These control numbers can be received, for example, at computer system 115 from financial organization computer system 110. At block 615 an authentication grid can be created with randomly created characters populating each grid location. At block 620 the authentication grid can be printed on the financial product or on the package of the financial product with or without the control number. At block 625 the authentication grid can be saved in conjunction with the control number; for example, in control number database 120. Alternatively, a string of characters corresponding to the characters populating the authentication grid can be saved in conjunction with the control number. Method 600 can then end at block 630.

The blocks shown in method 600 can be rearranged, blocks can be added, and/or blocks can be deleted without limitation.

Figure 7:
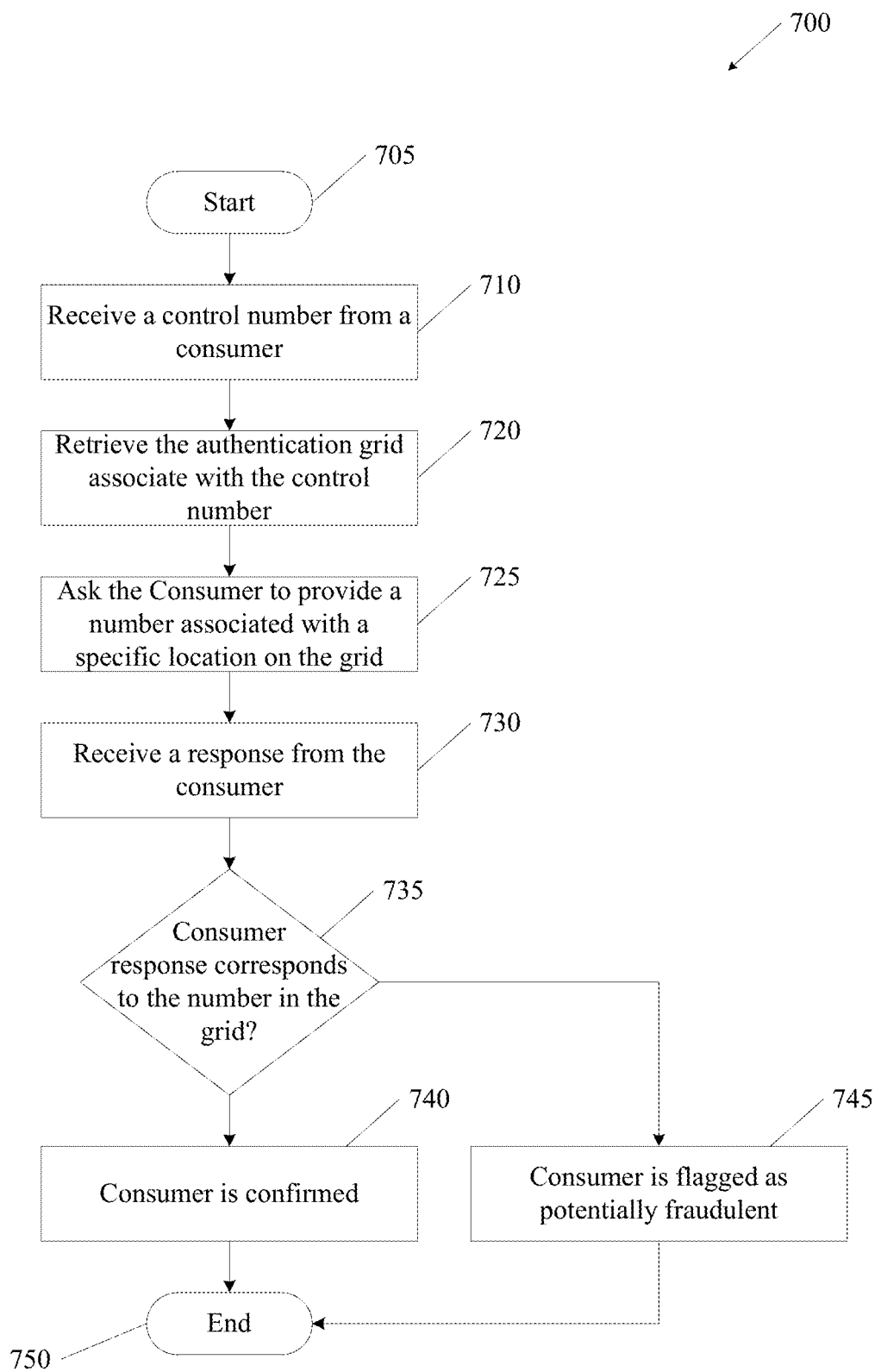
FIG. 7 is a flowchart of a method for using an authentication grid according to some embodiments of the invention.

FIG. 7 is a flowchart of method 700 for using an authentication grid according to some embodiments of the invention. Method 700 starts at block 705. At block 710 a control number can be received from a consumer. For example, the control number can be received from a consumer through consumer interface system 125. The control number, for example, can be requested for authentication for a money transfer or other financial transaction. The control number, for example, can be requested and/or received through a web interface using web server 130, an agent using agent system 135, a call center agent using call center system 140, or another consumer interface.

At block 720 the control number can be used to retrieve the authentication grid associated with the control number. In some embodiments, an actual authentication grid may not be retrieved. Instead, a string of characters can be retrieved that map to the elements in the authentication grid. This can be done, for example, with computer system 115 retrieving the authentication grid (or string of characters or other data) from control number database 120.

Using the authentication grid, the consumer can be asked to provide a character associated with a specific location on the grid at block 725. Using authentication grid 200 as an example, the consumer can be asked to provide the character found in grid location F6. That is, the character at the intersection of column F and row 6. In this example, the character is "x". The consumer can be asked to provide this character, for example, through a web page hosted by web server 130, an agent using agent system 135, a call center agent using call center system 140, or another consumer interface.

Ideally, the consumer is in possession of the authentication grid printed on the packaging or financial product and can provide the correct response. In the example mentioned above, the consumer can look up the printed character in column F and row 6 of printed authentication grid 200, which should be the letter "x". At block 730 a response from the consumer can be received by the system. At block 735, the received response can be compared with the number in the grid. Thus, in the current example using authentication grid 200, if the consumer responds with the character "x" method 700 proceeds to block 740, if anything else is returned then method 700 proceeds to block 745. Method 700 can end at block 750.

In some embodiments, blocks 725, 730, and 735 can be repeated any number of times with different grid locations being provided to the consumer to provide further authentication assurance.

In some embodiments, the authentication grid may not be completely recreated in block 720. Instead, for example, a string of characters along with knowledge of the authentication grid layout can be used to query the consumer. At block 725 of method 700, a random column and row can be requested. The character number in the character string associated with the control number can be identified based on the size of the grid. For example, grid 500 shows the character number within a string for each grid location. The consumer's response can be compared with the character from the string without creating a grid. Assuming now that character string 505 in FIG. 5 is a string of randomly generated characters, grid location F4 corresponds to the $30^{th}$ character in the hash value. And as shown in character string 505 of FIG. 5, the $30^{th}$ character is the letter "a", which is the letter shown at grid location F4 in authentication grid 510.

The blocks shown in method 700 can be rearranged, blocks can be added, and/or blocks can be deleted without limitation.

Figure 8:
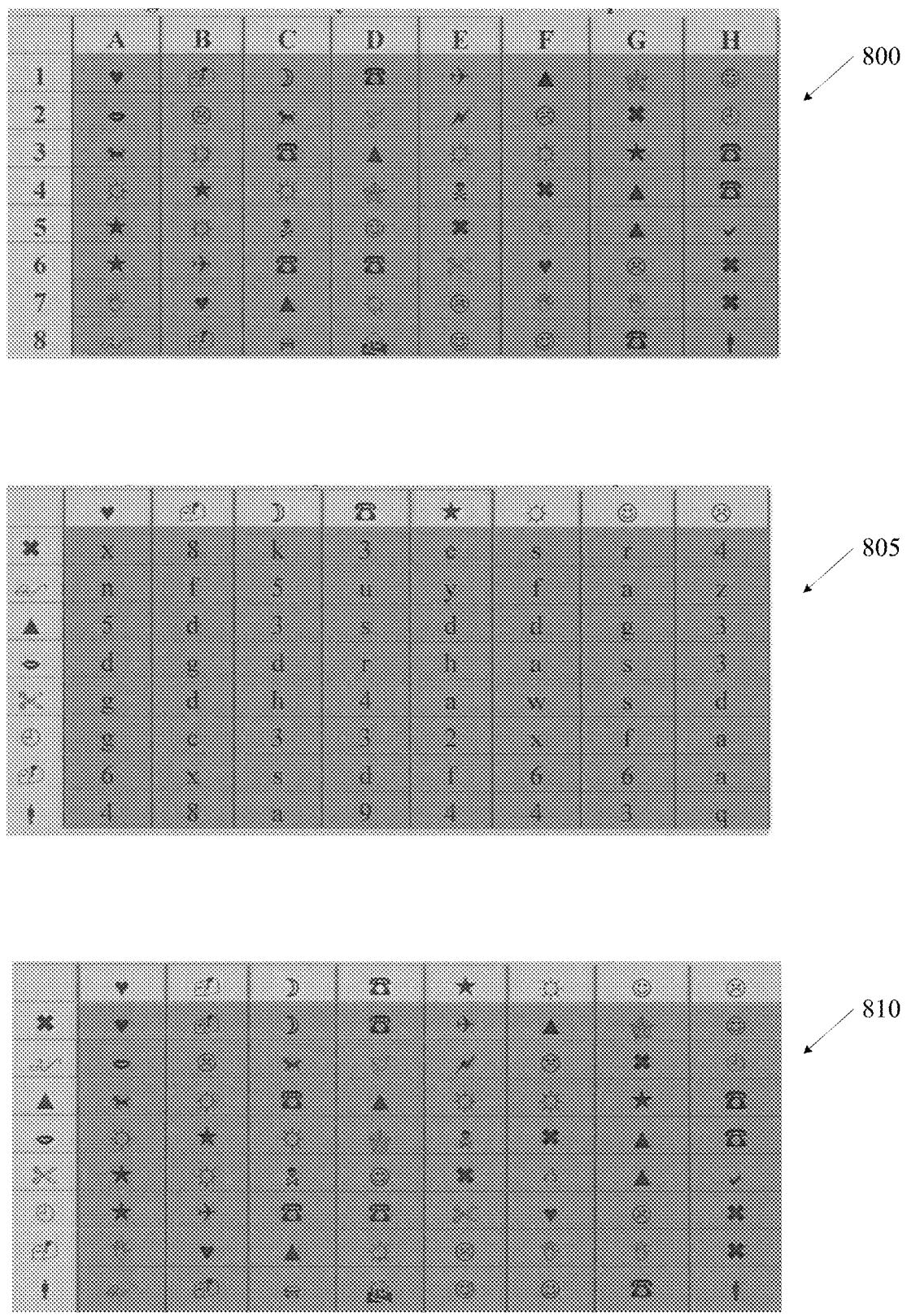
FIG. 8 shows examples of authentication grids that can be used to provide authentication according to some embodiments of the invention.

FIG. 8 shows examples of authentication grids that can be used to provide authentication according to some embodiments of the invention. Authentication grid 800 uses symbols, instead of characters, within the grid location. As shown, various types of symbols are used including triangles, smiley faces, stars, telephones, mailboxes, hands, hearts, etc. can be used without limitation. These symbols may be easier to communicate with an agent during authentication than number or letters, especially between individuals with different language backgrounds. The column and row headers, in this example, can still be numbers, while the grid locations are filled with symbols.

Authentication grid 800 can be created, for example, from random characters produced using a random number generator or from a hash value produced using a cryptographic function as described above. The individual characters returned from either generator or function can be mapped to a symbol using a symbol-to-character coder.

Authentication grid 805 is an example of an authentication grid that uses symbols for the row and column headers and characters within the grid locations. And authentication 810 is an example of an authentication grid that uses symbols for the column and row headers as well as within the grid locations.

Authentication grids can include any dimension and/or size. For instance the grid can have any number of rows and/or columns without limitation.

Computer system 900, shown in FIG. 9, includes hardware elements that may be electrically coupled via a bus 990. The hardware elements may include one or more central processing units 910, one or more input devices 920 (e.g., a mouse, a keyboard, etc.), and one or more output devices 930 (e.g., a display device, a printer, etc.). Computer system 900 may also include one or more storage device 940. For example, storage device(s) 940 may be disk drives, optical storage devices, solid-state storage device such as a random access memory ("RAM") and/or a read-only memory ("ROM"), which can be programmable, flash-updateable and/or the like.

Computer system 900 may additionally include a computer-readable storage media reader 950, a communications system 960 (e.g., a modem, a network card (wireless or wired), an infra-red communication device, Bluetooth™ device, cellular communication device, etc.), and working memory 980, which may include RAM and ROM devices as described above. In some embodiments, computer system 900 may also include a processing acceleration unit 970, which can include a digital signal processor, a special-purpose processor and/or the like.

Computer-readable storage media reader 950 can further be connected to a computer-readable storage medium, together (and, optionally, in combination with storage device (s) 940) comprehensively representing remote, local, fixed, and/or removable storage devices plus storage media for temporarily and/or more permanently containing computer-readable information. Communications system 960 may permit data to be exchanged with a network, system, computer and/or other component described above.

Computer system 900 may also comprise software elements, shown as being currently located within a working memory 980, including an operating system 984 and/or other code 988. It should be appreciated that alternate embodiments of computer system 900 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 900 may include code 988 for implementing any or all of the function of the various elements of the architecture as described herein. For example, software, stored on and/or executed by a system such as computer system 900, can provide the functions of the stored value provider subsystem, user subsystem, bill payment subsystem, gateway subsystem, and/or other components of the invention such as those discussed above. Methods implementable by software on some of these components have been discussed above in more detail.

Figure 10:
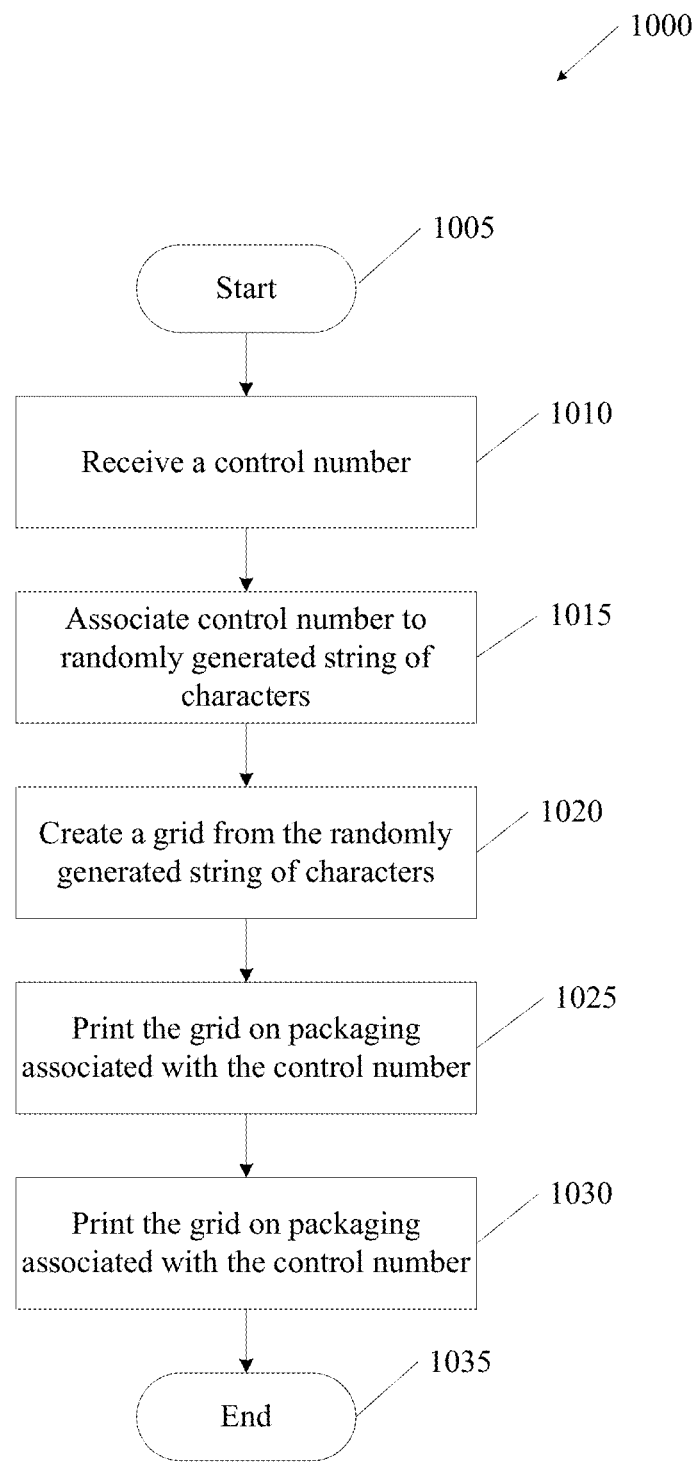
FIG. 10 is a flowchart of a method for creating an authentication grid according to some embodiments of the invention.

FIG. 10 is a flowchart of method 1000 for creating an authentication grid according to some embodiments of the invention. Method 1000 begins at block 1005. At block 1010 one or more control numbers are received. These control numbers can be received, for example, at computer system 115 from financial organization computer system 110. At block 1015 a randomly generated string of characters can be created. At block 1020, a grid can be created from the string of characters with one or more characters populating each grid location. At block 1025 the authentication grid can be printed on the financial product or on the package of the financial product with or without the control number. At block 1030 the authentication grid and/or the string of characters can be saved in conjunction with the control number; for example, in control number database 120. Method 1000 can then end at block 1030.

The blocks shown in method 1000 can be rearranged, blocks can be added, and/or blocks can be deleted without limitation.

Figure 11:
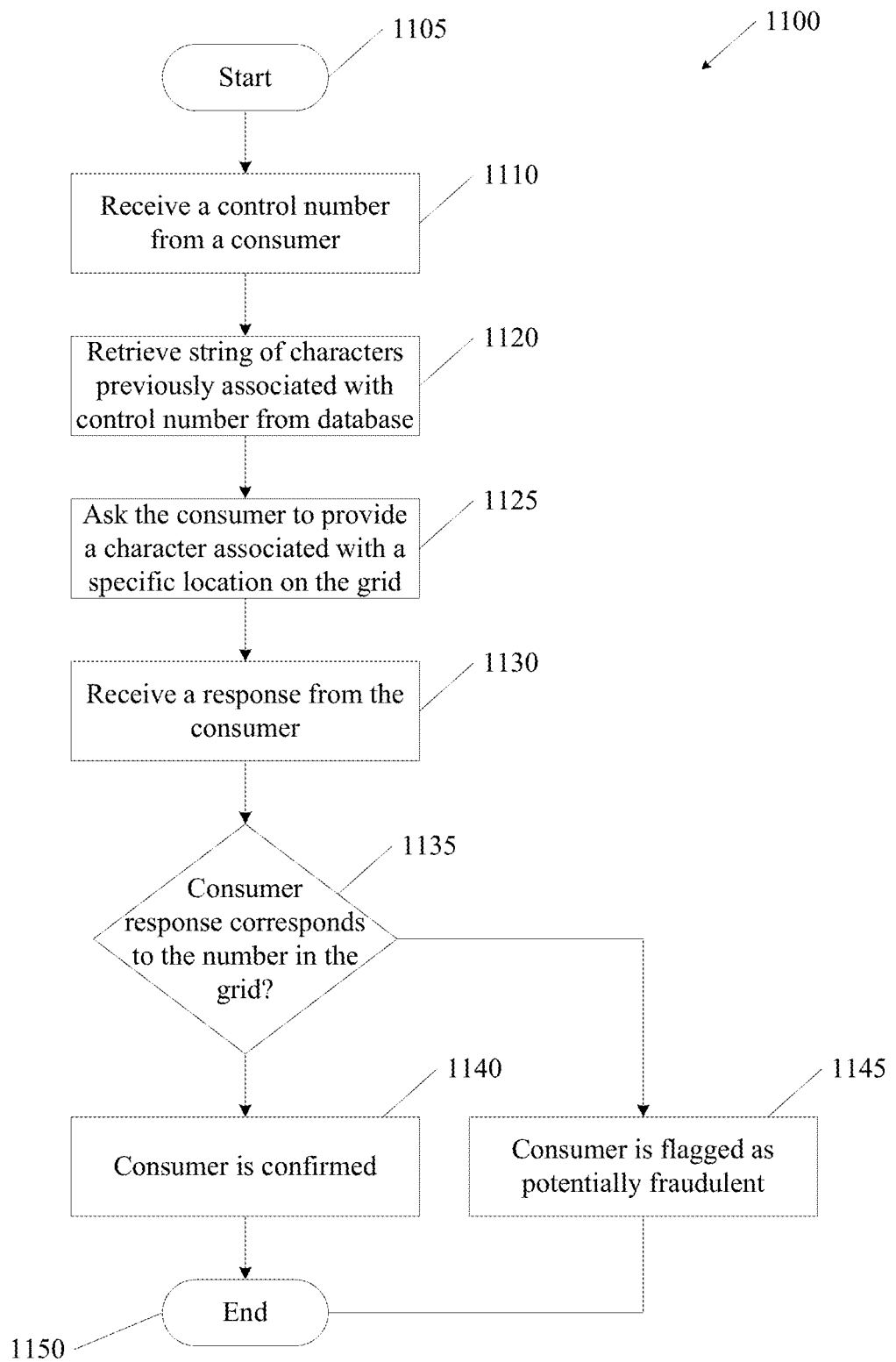
FIG. 11 is a flowchart of a method for using an authentication grid according to some embodiments of the invention.

FIG. 11 is a flowchart of method 100 for using an authentication grid according to some embodiments of the invention. Method 100 starts at block 1105. At block 1110 a control number can be received from a consumer. For example, the control number can be received from a consumer through consumer interface system 125. The control number, for example, can be requested for authentication for a money transfer or other financial transaction. The control number, for example, can be requested and/or received through a web interface using web server 130, an agent using agent system 135, a call center agent using call center system 140, or another consumer interface.

At block 1120 the control number can be used to retrieve a string of characters grid associated with the control number. The string of characters can map to the elements in the authentication grid. This can be done, for example, with computer system 115 retrieving the string of characters from control number database 120.

Using the string of characters, the consumer can be asked to provide a character associated with a specific location on the grid at block 1125. Using authentication grid 200 as an example, the consumer can be asked to provide the character found in grid location F6. That is, the character at the intersection of column F and row 6. In this example, the character is "x". Grid 500 can be used, for example, to map character numbers to the authentication grid and vice versa. Various other techniques can be used. The consumer can be asked to provide this character, for example, through a web page hosted by web server 130, an agent using agent system 135, a call center agent using call center system 140, or another consumer interface.

Ideally, the consumer is in possession of the authentication grid printed on the packaging or financial product and can provide the correct response. In the example mentioned above, the consumer can look up the printed character in column F and row 6 of printed authentication grid 200, which should be the letter "x". At block 1130 a response from the consumer can be received by the system. At block 1135, the received response can be compared with the number in the grid. Thus, in the current example using authentication grid 200, if the consumer responds with the character "x" method 1100 proceeds to block 1140, if anything else is returned then method 1100 proceeds to block 1145. Method 1100 can end at block 1150.

In some embodiments, at block 1125 of method 1100, a random column and row can be requested. The character number in the character string associated with the control number can be identified based on the size of the grid. For example, grid 500 shows the character number within a string for each grid location. The consumer's response can be compared with the character from the string without creating a grid. Assuming now that character string 505 in FIG. 5 is a string of randomly generated characters, grid location F4 corresponds to the 30$^{th}$ character in the hash value. And as shown in character string 505 of FIG. 5, the 30$^{th}$ character is the letter "a", which is the letter shown at grid location F4 in authentication grid 510.

In some embodiments, blocks 1125, 1130, and 1135 can be repeated any number of times with different grid locations being provided to the consumer to provide further authentication assurance.

The blocks shown in method 1100 can be rearranged, blocks can be added, and/or blocks can be deleted without limitation.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method comprising:
consequent to receiving a plurality of control numbers from a first computer system communicatively coupled via a network to an authentication computer system, for each respective control number of the plurality of control numbers:
creating, by the authentication computer system, a data structure corresponding to a respective authentication grid;
causing, by the authentication computer system, storage of data corresponding to the respective authentication grid in a database server communicatively coupled to the authentication computer system via the network at least partially by transmitting the respective authentication grid so that the respective authentication grid is stored in association with the respective control number by the database server;
causing, by the authentication computer system, printing of a respective stored value card with the respective authentication grid printed on the stored value card by a printing device of a second system communicatively coupled to the authentication computer system by the network at least partially by transmitting the respective authentication grid to the second system;
consequent to the printing of a stored value card, communicating, by the authentication computer system, with an intermediary system to facilitate authentication of the stored value card for a transaction, the intermediary system comprising a web server that controls serving of content for rendering on a user device to expose a web interface to prompt input of a control number from the stored value card;
consequent to the exposing of the web interface, receiving, by the authentication computer system, a control number via the intermediary system from the user device associated with a consumer, wherein the stored value card comprises a first authentication grid printed on the stored value card;
consequent to the receiving the control number and based at least in part on the data stored by the database server:
generating, by the authentication computer system, a hash value from the control number using a cryptographic function, wherein the hash value comprises a particular number of characters; and
producing, by the authentication computer system, a representation of the first authentication grid using the hash value, the representation of the first authentication grid comprising a plurality of non-alpha-numeric symbols corresponding to the particular number of characters and identifiable by non-alpha-numeric row and column identifiers, the non-alpha-numeric symbols repeating a number of times through the authentication grid equal to a quotient of (a) a product of a total number of rows of the authentication grid and a total number of columns of the authentication grid and (b) the particular number of characters;
identifying, by the authentication computer system, a specific non-alpha-numeric row identifier and a specific non-alpha-numeric column identifier that corresponds to one or more positions on the first authentication grid printed on the stored value card;
sending, from the authentication computer system to the user device via the intermediary system, a request to provide the symbol associated with the specific non-alpha-numeric row identifier and the specific non-alpha-numeric column identifier;
receiving, by the authentication computer system, a response from the intermediary system that includes a non-alpha-numeric response symbol;
comparing, by the authentication computer system, the non-alpha-numeric response symbol with the non-alpha-numeric symbol in the representation of the first authentication grid associated with the specific non-alpha-numeric row identifier and the specific non-alpha-numeric column identifier; and
in an event the received non-alpha-numeric response symbol and the non-alpha-numeric symbol in the representation of the first authentication grid associated with the specific non-alpha-numeric row identifier and the specific non-alpha-numeric column identifier match, authenticating, by the authentication computer system, the consumer as a holder of the stored value card.

2. The method according to claim 1, wherein:
receiving the control number comprises receiving the control number through a web server; and
sending to the consumer the request to provide the symbol associated with the specific non-alpha-numeric row identifier and the specific non-alpha-numeric column identifier comprises sending the request through the web server.

3. The method according to claim 1, wherein:
receiving the control number comprises receiving the control number through an agent computer system; and
sending to the consumer the request to provide the symbol associated with the specific non-alpha-numeric row identifier and the specific non-alpha-numeric column identifier comprises sending the request to the agent computer system.

4. The method according to claim 3, wherein:
the agent computer system is located at a call center.

5. A non-transitory, machine-readable medium having instructions stored thereon, the instructions executable by one or more processors for at least:
consequent to receiving a plurality of control numbers from a first computer system communicatively coupled via a network to an authentication computer system, for each respective control number of the plurality of control numbers:
creating a data structure corresponding to a respective authentication grid;
causing storage of data corresponding to the respective authentication grid in a database server communicatively coupled to the authentication computer system via the network at least partially by transmitting the respective authentication grid so that the respective authentication grid is stored in association with the respective control number by the database server;
causing printing of a respective stored value card with the respective authentication grid printed on the stored value card by a printing device of a second system communicatively coupled to the authentication computer system by the network at least partially by transmitting the respective authentication grid to the second system;
consequent to the printing of a stored value card, communicating with an intermediary system to facilitate authentication of the stored value card for a transaction, the intermediary system comprising a web server that controls serving of content for rendering on a user device to expose a web interface to prompt input of a control number from the stored value card;
consequent to the exposing of the web interface, receiving a control number via the intermediary system from the user device associated with a consumer, wherein the stored value card comprises a first authentication grid printed on the stored value card;
consequent to the receiving the control number and based at least in part on the data stored by the database server:
generating a hash value from the control number using a cryptographic function, wherein the hash value comprises a particular number of characters; and
producing a representation of the first authentication grid using the hash value, the representation of the first authentication grid comprising a plurality of non-alpha-numeric symbols corresponding to the particular number of characters and identifiable by non-alpha-numeric row and column identifiers, the non-alpha-numeric symbols repeating a number of times through the authentication grid equal to a quotient of (a) a product of a total number of rows of the authentication grid and a total number of columns of the authentication grid and (b) the particular number of characters;
identifying a specific non-alpha-numeric row identifier and a specific non-alpha-numeric column identifier that corresponds to one or more positions on the first authentication grid printed on the stored value card;
sending to the user device via the intermediary system a request to provide the symbol associated with the specific non-alpha-numeric row identifier and the specific non-alpha-numeric column identifier;
receiving a response from the intermediary system that includes a non-alpha-numeric response symbol;
comparing the non-alpha-numeric response symbol with the non-alpha-numeric symbol in the representation of the first authentication grid associated with the specific non-alpha-numeric row identifier and the specific non-alpha-numeric column identifier; and
in an event the received non-alpha-numeric response symbol and the non-alpha-numeric symbol in the representation of the first authentication grid associated with the specific non-alpha-numeric row identifier and the specific non-alpha-numeric column identifier match, authenticating the consumer as a holder of the stored value card.

6. The non-transitory, machine-readable medium of claim 5, wherein:
receiving the control number comprises receiving the control number through a web server; and
sending to the consumer the request to provide the symbol associated with the specific non-alpha-numeric row identifier and the specific non-alpha-numeric column identifier comprises sending the request through the web server.

7. The non-transitory, machine-readable medium of claim 5, wherein:
receiving the control number comprises receiving the control number through an agent computer system; and
sending to the consumer the request to provide the symbol associated with the specific non-alpha-numeric row identifier and the specific non-alpha-numeric column identifier comprises sending the request to the agent computer system.

8. The non-transitory, machine-readable medium of claim 7, wherein:
the agent computer system is located at a call center.

9. A system comprising:
an authentication computer system for at least:
consequent to receiving a plurality of control numbers from a first computer system communicatively coupled via a network to the authentication computer system, for each respective control number of the plurality of control numbers:
creating a data structure corresponding to a respective authentication grid;
causing storage of data corresponding to the respective authentication grid in a database server communicatively coupled to the authentication computer system via the network at least partially by transmitting the respective authentication grid so that the respective authentication grid is stored in association with the respective control number by the database server;
causing printing of a respective stored value card with the respective authentication grid printed on the stored value card by a printing device of a second system communicatively coupled to the authentication computer system by the network at least partially by transmitting the respective authentication grid to the second system;
consequent to the printing of a stored value card, communicating with an intermediary system to facilitate authentication of the stored value card for a transaction, the intermediary system comprising a web server that controls serving of content for rendering on a user device to expose a web interface to prompt input of a control number from the stored value card;
consequent to the exposing of the web interface, receiving a control number via the intermediary system from the user device associated with a consumer, wherein the stored value card comprises a first authentication grid printed on the stored value card;
consequent to the receiving the control number and based at least in part on the data stored by the database server:
generating a hash value from the control number using a cryptographic function, wherein the hash value comprises a particular number of characters; and
producing a representation of the first authentication grid using the hash value, the representation of the first authentication grid comprising a plurality of non-alpha-numeric symbols corresponding to the particular number of characters and identifiable by non-alpha-numeric row and column identifiers, the non-alpha-numeric symbols repeating a number of times through the authentication grid equal to a quotient of (a) a product of a total number of rows of the authentication grid and a total number of columns of the authentication grid and (b) the particular number of characters;
identifying a specific non-alpha-numeric row identifier and a specific non-alpha-numeric column identifier that corresponds to one or more positions to the first authentication grid printed on the stored value card;
sending to the user device via the intermediary system a request to provide the symbol associated with the specific non-alpha-numeric row identifier and the specific non-alpha-numeric column identifier;
receiving a response from the intermediary system that includes a non-alpha-numeric response symbol;

comparing the non-alpha-numeric response symbol with the non-alpha-numeric symbol in the representation of the first authentication grid associated with the specific non-alpha-numeric row identifier and the specific non-alpha-numeric column identifier; and in an event the received non-alpha-numeric response symbol and the non-alpha-numeric symbol in the representation of the first authentication grid associated with the specific non-alpha-numeric row identifier and the specific non-alpha-numeric column identifier match, authenticating the consumer as a holder of the stored value card.

10. The system of claim 9, wherein:

receiving the control number comprises receiving the control number through a web server; and sending to the consumer the request to provide the symbol associated with the specific non-alpha-numeric row identifier and the specific non-alpha-numeric column identifier comprises sending the request through the web server.

11. The system of claim 9, wherein:

receiving the control number comprises receiving the control number through an agent computer system; and sending to the consumer the request to provide the symbol associated with the specific non-alpha-numeric row identifier and the specific non-alpha-numeric column identifier comprises sending the request to the agent computer system.

12. The system of claim 11, wherein:

the agent computer system is located at a call center.

\* \* \* \* \*